United States Patent
Jevons et al.

(10) Patent No.: US 8,808,847 B2
(45) Date of Patent: Aug. 19, 2014

(54) LAYERED COMPOSITE COMPONENT

(75) Inventors: Matthew P. Jevons, Derby (GB); Robert Backhouse, Wells (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/525,821

(22) Filed: Jun. 18, 2012

(65) Prior Publication Data

US 2013/0011625 A1    Jan. 10, 2013

(30) Foreign Application Priority Data

Jul. 7, 2011   (GB) .................................. 1111598.7

(51) Int. Cl.
| B32B 3/00 | (2006.01) |
| B32B 3/02 | (2006.01) |
| B32B 3/06 | (2006.01) |
| B32B 3/08 | (2006.01) |
| B32B 5/00 | (2006.01) |
| F01D 5/00 | (2006.01) |
| F01D 5/28 | (2006.01) |

(52) U.S. Cl.
CPC ..................................... F01D 5/282 (2013.01)
USPC ........ 428/221; 428/172; 428/292.1; 415/200; 416/229 A; 416/230

(58) Field of Classification Search
USPC ........ 428/119, 120, 292.1, 297.4, 298.1, 172, 428/221; 415/200; 416/229 A, 230
See application file for complete search history.

(56) References Cited

U.S. PATENT DOCUMENTS

| 3,602,608 | A | 8/1971 | Morley |
| 3,834,832 | A | 9/1974 | Mallinder et al. |
| 4,808,461 | A | 2/1989 | Boyce et al. |
| 5,308,228 | A | 5/1994 | Benoit et al. |
| 5,375,978 | A | 12/1994 | Evans et al. |
| 5,876,540 | A | 3/1999 | Pannell |
| 6,436,507 | B1 * | 8/2002 | Pannell ......................... 428/102 |
| 6,481,172 | B1 | 11/2002 | Porter |

(Continued)

FOREIGN PATENT DOCUMENTS

| GB | 1 245 342 | 9/1971 |
| GB | 1 305 755 | 2/1973 |

(Continued)

OTHER PUBLICATIONS

Sep. 27, 2012 Search Report issued in European Patent Application No. 12 17 2353.
Oct. 11, 2011 British Search Report issued in British Patent Application No. GB1111598.7.

*Primary Examiner* — Aaron Austin
*Assistant Examiner* — Joanna Pleszczynska
(74) *Attorney, Agent, or Firm* — Oliff PLC

(57) ABSTRACT

A layered composite component is disclosed, the component including: a plurality of stacked layers defining a component thickness between opposed component surfaces and at least one reinforcing element extending from each of the opposed component surfaces the reinforcing elements extending at least partially through the component thickness. Another layered composite component is also disclosed, the component including: a plurality of stacked layers defining a plane and having a primary in-plane axis, wherein the at least one block array of reinforcing elements extends into the component along a reinforcing direction that is angled with respect to the plane of the stacked layers, and wherein the at least one block array is angled in the plane of the stacked layers with respect to the primary axis.

12 Claims, 3 Drawing Sheets

(56) References Cited

U.S. PATENT DOCUMENTS

| | | |
|---|---|---|
| 7,008,689 B2 | 3/2006 | Hawkins et al. |
| 7,547,194 B2 * | 6/2009 | Schilling ........................ 416/230 |
| 2002/0160146 A1 | 10/2002 | Homma et al. |
| 2003/0203179 A1 | 10/2003 | Hawkins et al. |
| 2008/0193709 A1 | 8/2008 | Han |
| 2011/0070092 A1 * | 3/2011 | Gerlach ........................ 416/230 |

FOREIGN PATENT DOCUMENTS

| | | |
|---|---|---|
| GB | 1 411 484 | 10/1975 |
| GB | 2 227 205 A | 7/1990 |
| GB | 2 261 589 A | 5/1993 |
| WO | WO 98/04495 A1 | 2/1998 |

\* cited by examiner

LAYERED COMPOSITE COMPONENT

The present invention relates to a layered composite component and to a method of forming a layered composite component. Such components commonly comprise stacked, laminated layers of reinforcing fibres embedded in a matrix material.

Composite materials are widely used in a range of industries, and can offer significant advantages over metallic alternatives. Particularly in the aerospace industry, composite materials can contribute to weight reduction with desirable strength to weight rations, as well as offering resistance to most chemical and environmental threats. Component parts of the fan and/or compressor systems of gas turbine engines, including containment casings, fan blades, and secondary structures, lend themselves to composite construction owing to the relatively low temperatures at which they operate. Over these operating temperature ranges, composites materials can provide the required levels of robustness, durability, strength and strain to failure.

Composite materials of the type used in the aerospace industry generally comprise stacked, laminated layers of reinforcing fibres embedded in a matrix material. The reinforcing fibres extend in the plane of the layers and may be uni directional, or may extend in a variety of configurations and lay up directions. A range of materials may be used for the reinforcing fibres, including carbon, graphite, glass and various metals. Regardless of the particular materials and manufacturing process used, all composites exhibit certain shortcomings. Significant among these is the comparatively poor interlaminar strength of composite materials. Composite properties in the X-Y plane, along the plane of the stacked layers, are dominated by the reinforcing fibres, meaning material strength and strain to failure in the X-Y plane are excellent. Consequently, manufacturing methods used to produce two dimensional composite structures are well developed. However, interlaminar properties, in the Z direction, are dominated by the matrix material, meaning that strength and fracture toughness in this direction are comparatively poor, limiting the use of composites in many applications.

Cracks or delaminations caused by thermal effects, impact events, or the presence of holes or free edges in the composite may seriously reduce compressive and flexural loading capacities or cause large scale delamination which may result in premature structural failure. In the case of aerospace engines, composite components are subject to damage from ingestion into the engine and impact of foreign objects. Such objects can be airborne or drawn into the engine inlet. These include various types and sizes of birds as well as inanimate objects such as hailstones, sand, land ice, and runway debris. Impact damage to the airofoil of blading members, including fan and compressor blades, as well as damage to strut type members in the air stream, has been observed to cause loss of material and/or delamination of the stacked layers. This level of damage can reduce the operating integrity and life of a composite article. In a rotating blade, it can cause the engine to become unbalanced resulting in potentially severe, detrimental vibration.

There are a number of techniques for overcoming these limitations in composites. The two most frequently used are toughened matrices and "through thickness" reinforcing fibres. Toughened matrices are often significantly more expensive than baseline systems, have poor hot wet properties, and still may not offer sufficient toughness for a successful part design. Consequently, through thickness reinforcement is often the more desirable option, and several techniques have been developed for placing fibres through the thickness of composites to improve their interlaminar properties.

Stitching, stapling, and needling are all known techniques for introducing through thickness reinforcement. However, these methods are all prone to causing a significant reduction of in-plane properties, are difficult to implement within complex-shaped components, and limit the type of fibre which can be used for reinforcement. Stitching uses needles which are often in excess of 5 mm in width. When penetrating a fibre laminate with a needle of this size, significant cutting or damage is caused to the load carrying in-plane fibres. This can lead to strength reductions in excess of 20%. In addition to this needle damage, stitching uses a continuous thread which can damage surface layers. The loop in the thread traversing from one stitch to the next "kinks" the in-plane fibres of the top few layers, creating significant strength loss. Owing to the demanding bend radii of stitching, the fibres that can practically be used are limited to glass and Aramid type fibres, such as KEVLAR®. These materials are not the most effective through thickness reinforcements for all applications, and have been known to absorb moisture, which is undesirable.

One technique for overcoming these problems and disadvantages involves inserting longitudinal pins or staples through the thickness of the composite material, in the Z direction. U.S. Pat. No. 4,808,461 discloses a method of insertion of so called Z-pins, in which a plurality of reinforcing pins are disposed wholly in a direction perpendicular to the plane of a body of thermally decomposable material. This structure is then subjected to an elevated temperature which decomposes the thermally decomposable material. Pressure is used to drive the reinforcing elements into the structure which is then cured. The final composite part will contain the perpendicularly disposed reinforcing elements, adding strength at desired locations of the composite part. According to other methods, a pin carrier may be used to drive pins perpendicularly into a layup of pre impregnated (pre-preg) fibres, which is then shaped and cured. U.S. Pat. No. 7,008,689 discusses the location of Z direction reinforcement, disclosing the distribution of Z pins according to the level of expected strain in any particular component region.

While addressing the in plane damage issues of stitching, these techniques, too, have disadvantages. For example, while reinforcing fibres introduced purely perpendicular to the plane of the composite significantly reduce the tendency of the laminate to peel apart (mode I fracture—see FIG. 1), they do not provide comparable resistance to shear or mode II dominated failures. This is because these loads generally occur parallel to the in plane fibres of the composite and the reinforcing fibres are normal to the in-plane fibres. In order to address this, it is known to manually insert reinforcing rods at an angle to the in-plane fibres in laminates along critically high stress planes. This can be done before the lay-up of, for example, graphite-epoxy layers is cured. However, manual insertion of each reinforcing rod, together with the experimentation and analysis required to predetermine the critically high stress planes, makes this technique labour intensive and hence costly. An alternative method involves manually driving individual thermosetting resin-impregnated fibrous reinforcements at an angle into a fibrous material lay-up by mechanical impact or similar tools. However, this technique also requires labour intensive and close tolerance manufacturing techniques not suitable for all applications.

When considering purely Z-direction reinforcing pins, it is known to vary the length of the pins, and their concentration in any one component region, according to component thickness and performance requirements. U.S. Pat. No. 3,834,832 describes a variety of Z-direction reinforcing elements that may be used in this manner. However, the application of such reinforcing elements remains limited to thin composite structures (up to ~16 mm) by the constraints of element length. In addition, sharp transitions between regions of pin reinforcement and regions without cause step changes in component properties which are undesirable. U.S. Pat. No. 7,008,689 looks to address the issue of pin concentration by inserting Z-direction reinforcing pins at a density within a region of a pre-prep ply or layer such that it resists the strain energy of that region. The disadvantage of this is that the strain energy is not the only requirement for such pins to fulfil, and to have a large number of pins in an area with high strain can be detrimental to the structure.

The present invention seeks to address some or all of the above mentioned disadvantages.

According to the present invention, there is provided a layered composite component comprising: a plurality of stacked layers defining a component thickness between opposed component surfaces; and at least one reinforcing element extending from each of the opposed component surfaces, the reinforcing elements extending at least partially through the component thickness.

The component surfaces may be planar. The layers may comprise arrays of in-plane reinforcing fibres embedded in a matrix material which may for example be an organic matrix material. The layers may define an X-Y plane of the component. The reinforcing fibres of the layers may be uni directional, bi directional, woven or any other appropriate configuration.

The reinforcing elements may extend perpendicular to the component surfaces. The reinforcing elements may thus extend along the Z axis of the component, perpendicular to the X-Y plane of the component layers.

The reinforcing elements may comprise pins. The reinforcing elements may comprise tufted reinforcing fibres.

A length of the reinforcing elements may be less than the thickness of the component.

Reinforcing elements extending from opposed component surfaces may overlap in a reinforcement direction.

The component may further comprise at least one intermediate reinforcing element, which may extend through a region of the component thickness that is distant from each of the opposed component surfaces.

Reinforcing elements from opposed component surfaces may overlap with the at least one intermediate reinforcing element in a reinforcing direction.

The reinforcing elements may be extend their full length within the component, the length being such that fully inserted, reinforcing elements extending from opposed component surfaces overlap with each other, or with an intermediate reinforcing element, in the reinforcement direction. Such overlap ensures that there is no layer within the component that has either no reinforcing elements or only element terminations.

Each stacked layer of the component may comprise in-plane reinforcing fibres having a direction, and the reinforcing elements may extend such that an overlap region in the reinforcing direction of the reinforcing elements includes adjacent stacked layers having different reinforcing fibre directions.

The overlap region of the elements may be at least the thickness of six stacked layers.

According to a standard stipulating that no more than four layers of the same orientation should be blocked together, a six layer overlap ensures that there is always at least one layer orientation change between reinforcing element terminations.

The reinforcing elements may be arranged in block arrays. For example the elements may be arranged in rectangular block arrays that may be w elements wide and/elements long.

Arrays of reinforcing elements that are adjacent in the plane of the component may extend from opposed component surfaces or comprise intermediate reinforcing elements. In this manner, clashing of elements inserted from opposed surfaces does not occur.

The stacked layers of the component may comprise a primary in-plane axis, and the arrays of reinforcing elements may be angled in the plane of the layers with respect to the primary in-plane axis.

The primary in-plane axis may for example be the x axis, with in-plane reinforcing fibres being oriented with respect to the primary axis. In an exemplary embodiment, the in-plane reinforcing fibres of the stacked layers may be oriented at 0, 45 or 90 degrees to the primary axis, or x axis.

The block arrays of reinforcing elements may be angled at 45 degrees to the x axis.

The block arrays of reinforcing elements may form a herringbone pattern. For the purposes of this specification, the phrase "herringbone pattern" refers to a 45 degree tessellation of substantially rectangular block arrays. An exemplary herringbone pattern is illustrated in FIG. 2.

According to another aspect of the present invention, there is provided a layered composite component comprising: a plurality of stacked layers defining a plane and having a primary in-plane axis; and at least one block array of reinforcing elements; wherein the at least one block array extends into the component along a reinforcing direction that is angled with respect to the plane of the stacked layers, and wherein the at least one block array is angled in the plane of the stacked layers with respect to the primary axis.

The angled nature of the block arrays with respect to the primary in-plane axis means that there is no step change in reinforcement along the primary axis. Thus a step change in component properties along this axis does not occur.

The block arrays of reinforcing elements may be angled at 45 degrees to the primary axis. Such angling ensures no step change in properties either along the primary axis or perpendicular to the primary axis.

The block arrays of reinforcing elements may be angled in the plane of the stacked layers to form a herringbone pattern.

Such a pattern provides a "feathering" effect, staggering the outline of the region of reinforcement and graduating the effect of the change in component properties between regions of reinforcement and regions without reinforcement.

The block arrays of reinforcing elements may extend along a reinforcing direction that is perpendicular to the plane of the stacked layers.

Arrays of reinforcing elements that are adjacent in the plane of the component may extend from opposed component surfaces.

The reinforcing elements may comprise at least one of pins, staples, stitches, tufts and through thickness woven fibres. For example, the reinforcing elements may comprise the through thickness element of warp threads in a 3D woven component.

The component may comprise at least one curved surface.

The component may be a component part of a gas turbine engine.

According to another aspect of the present invention, there is provided a method of forming a layered composite component, the component comprising a plurality of stacked layers defining opposed component surfaces, the method comprising inserting reinforcing elements from both of the opposed component surfaces, the reinforcing elements being inserted at an angle to the component surfaces.

The method may further comprise inserting intermediate reinforcing elements during layup of the layered composite component. The intermediate reinforcing elements may extend through a region of the component that is distant from each of the opposed component surfaces in the finished component. The intermediate reinforcing elements may be inserted to overlap in a reinforcing direction with the reinforcing elements inserted from the opposed component surfaces.

According to another aspect of the present invention, there is provided another method of forming a layered composite component, the component comprising a plurality of stacked layers defining a plane and having a primary in-plane axis, the method comprising inserting block arrays of reinforcing elements into the component along a reinforcing direction that is angled with respect to the plane of the stacked layers, the block arrays being oriented in the plane of the stacked layers so as to be angled with respect to the primary axis.

According to another aspect of the present invention, there is provided a gas turbine engine comprising a component made in accordance with the method of the present invention.

For a better understanding of the present invention, and to show more clearly how it may be carried into effect, reference will now be made, by way of example, to the following drawings, in which:—

The present invention provides a composite component that includes through thickness reinforcement. The invention also provides a method that allows thick composite structures of a thickness greater than the maximum available reinforcing element length to be reinforced in the through thickness direction. The component and method of manufacture also provide a gradual transition from areas of no reinforcement to areas of full reinforcement within the component.

Figure 1:
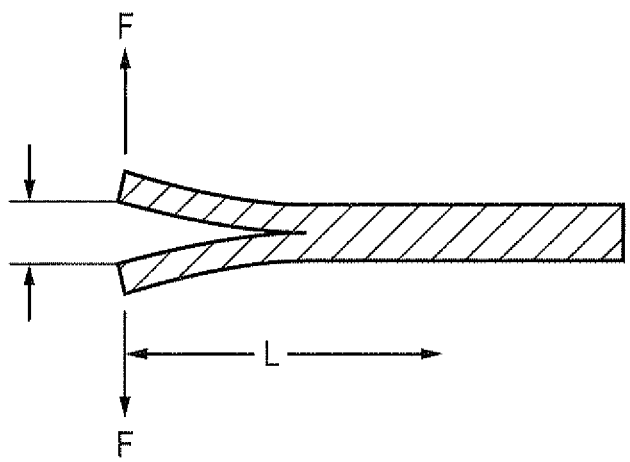
FIG. 1 illustrates delamination failure of a composite component.
Figure 2:
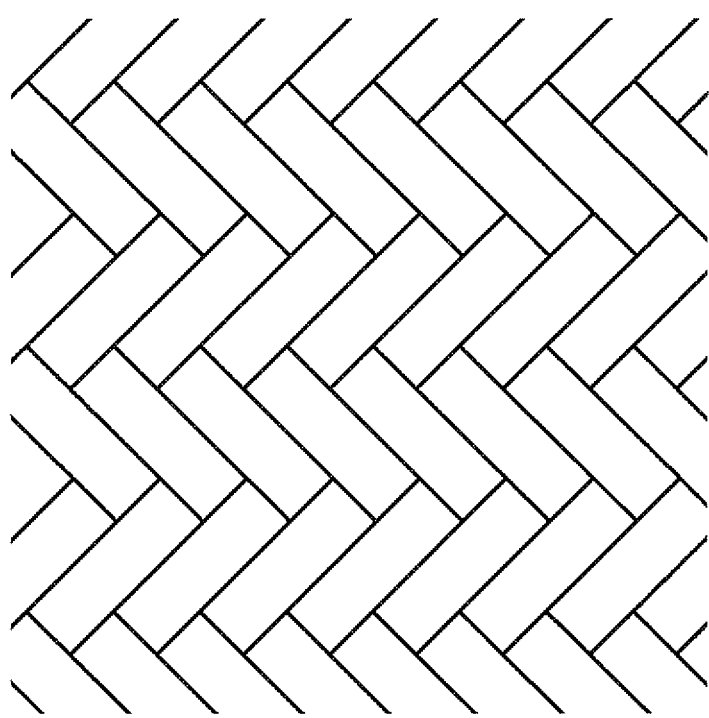
FIG. 2 is a representative illustration of a herringbone pattern.
Figure 3:
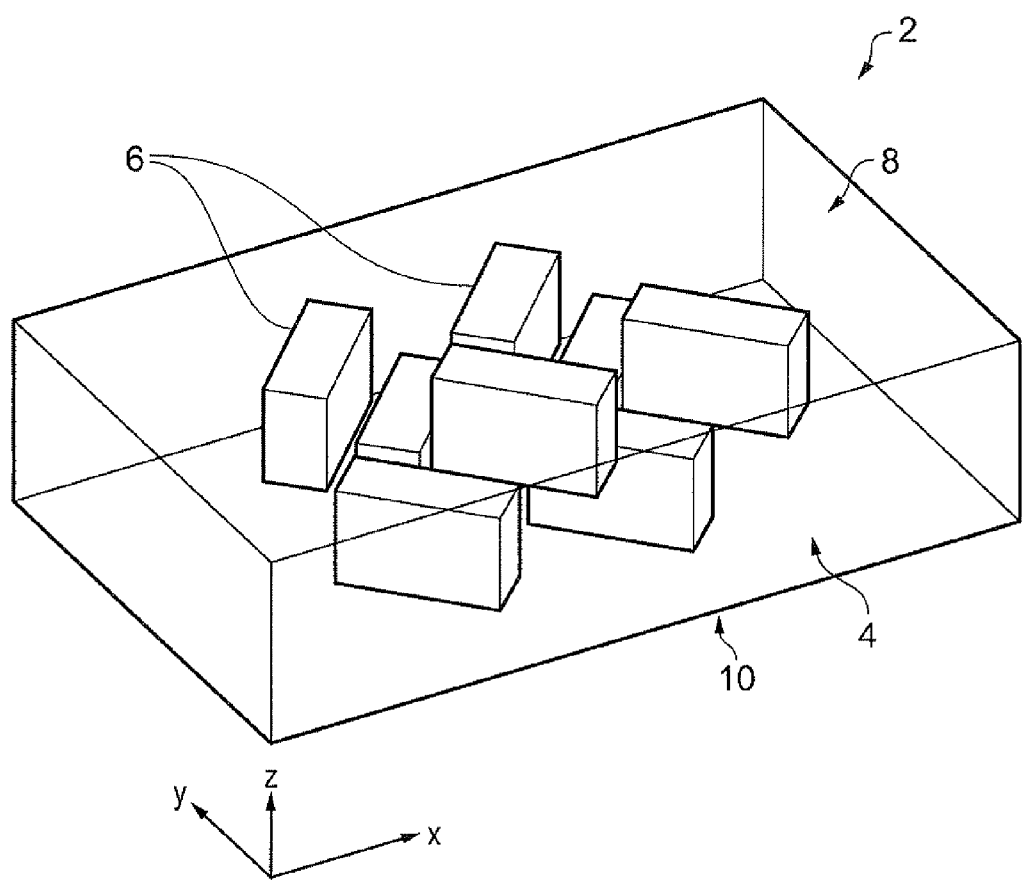
FIG. 3 is a schematic representation of a composite structure with block arrays of reinforcing elements.
Figure 4:
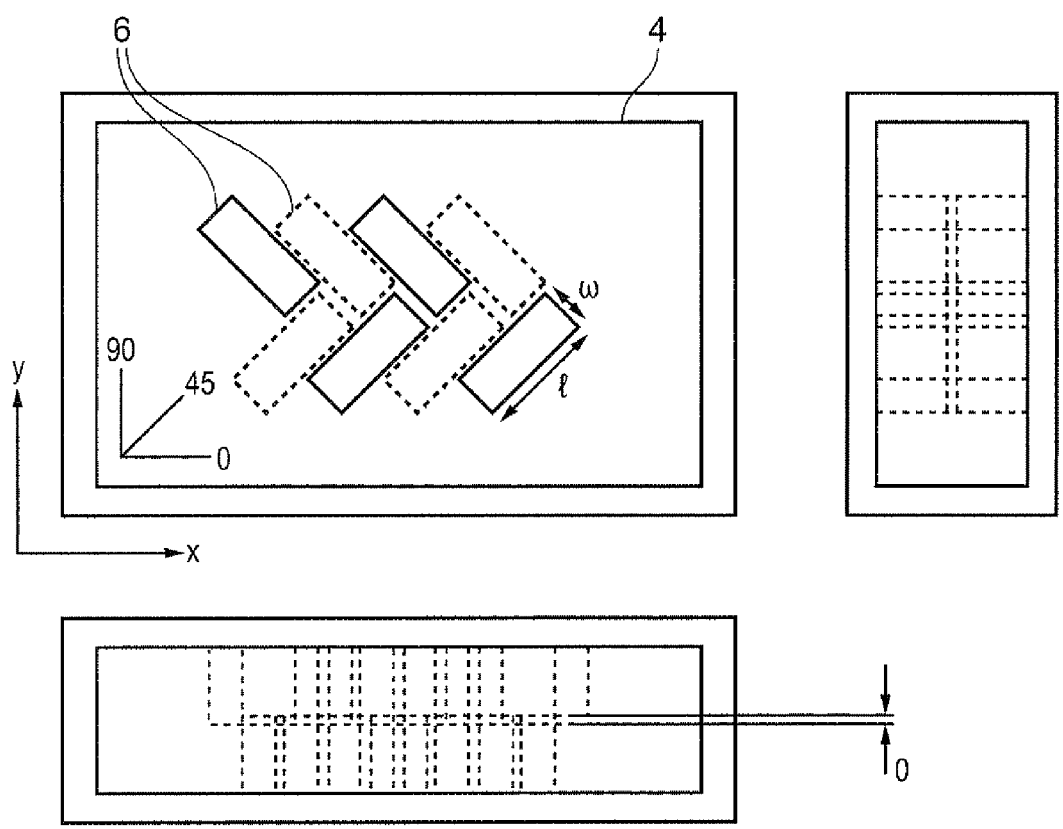
FIG. 4 is a third angle projection of the structure of FIG. 3.

FIGS. 3 and 4 illustrate a composite component according to the present invention. With reference to FIGS. 3 and 4, a composite component 2 comprises a primary structure 4, formed from laminated layers of reinforcing fibres embedded in a surrounding matrix. The primary structure 4 defines a component thickness between planar upper and lower surfaces 8, 10 of the component 2, and a principal plane of the component, illustrated as the X-Y plane in the Figures. The through thickness direction of the component is the Z direction. The orientation of the reinforcing fibres within the layers of the primary structure may be along a primary axis x, a secondary axis y, or may be at varying angles with respect to the primary and secondary axes. Several layers having fibres of the same orientation may be blocked together, although in order to conform to relevant standards, it is envisaged that no more than four layers having fibres of the same orientation should be blocked together.

The component 2 further comprises a plurality of block arrays of reinforcing elements, illustrated schematically at 6 on the Figures. The elements are illustrated in the Figures and described in the following disclosure as pins, however, it will be appreciated that the reinforcing elements may also comprise tufts of reinforcing material. Each block array 6 shown in the Figures comprises a regular array of reinforcing pins that is w pins wide, l pins long and has a depth in the direction of insertion equal to the length of the pins themselves. In the illustrated embodiment, the block arrays 6 have been inserted into and extend through the primary structure 4 perpendicular to the principal plane X-Y of the primary structure 4. However according to other embodiments, the block arrays may be inserted at other angles with respect to the principal X-Y plane. As best seen in the side and end projections of FIG. 4, the block arrays 6 extend through the primary structure 4 to the full depth of the arrays, that is the full length of the reinforcing pins, a surface of the arrays being level with the respective upper or lower surface of the component 2. In its finished state, the component therefore includes arrays of reinforcing pins that extend their full length within the primary structure, at least partially through the thickness of the component.

A number of the block arrays 6 have been inserted from, and thus extend from, the upper surface 8 of the component 2, while the remaining block arrays 6 have been inserted from and extend from the lower surface 10 of the component 2. This ensures that through thickness or Z-direction reinforcement is provided throughout the thickness of the component 2. It will be appreciated that, viewed from above as in the plan projection of FIG. 4, there is no overlap in the X-Y plane between the block arrays. This ensures that there is no clashing between arrays 6 inserted from opposing surfaces of the component 2. Viewed from the side, as seen in the end and side projections of FIG. 4, there is an overlap region of depth o between the pin arrays extending from the upper surface 8 and the arrays extending from the lower surface 10. An overlap region of this nature ensures that there is no layer or surface within the component 2 that contains either no Z-direction reinforcement or only terminations of reinforcing pins. The depth of this overlap region is dependent upon the length of the pins used, hence the depth of the block arrays, and on the thickness of the primary structure 4. In a preferred embodiment, the overlap region includes within it at least one change in fibre orientation between layers in the primary structure. The desired depth of the overlap region is thus determined by the number of layers of the same orientation that may be blocked together.

In a preferred embodiment, the component is constructed to conform to a standard according to which no more than four layers having fibres of the same orientation may be blocked together. It is therefore envisaged that an overlap region having a depth o of 6 layers will be sufficient to ensure the overlap region includes at least one change of fibre orientation between layers. This limitation then determines the maximum thickness of component 2 that may be formed according to a particular embodiment of the present invention. The maximum component thickness may be calculated as follows:

$$t_{max} = 2 \cdot L_{max} - 6 \cdot t_{ply}$$

Where $t_{max}$ is the maximum thickness of composite component that may be constructed according to this embodiment, $L_{max}$ is the maximum available length of the pins forming the arrays, and $t_{ply}$ is the cured thickness of each layer or ply forming the primary structure 4 of the component 2. Thus, for a maximum available pin length of 16 mm and a cured ply thickness of 0.25 mm, the maximum laminate thickness is 30.5 mm.

According to another embodiment of the present invention (not shown) the component further comprises at least one, and preferably at least one array, of intermediate reinforcing pins (or tufts of fibres). The array of intermediate reinforcing pins extends in the reinforcing direction through a region of the thickness of the component that is distant from both of the opposed component surfaces. The array of intermediate reinforcing pins is thus inserted during the lay up of the component, before the final component surfaces are formed. The array of intermediate reinforcing pins overlaps at each end in the reinforcing direction with other reinforcing elements. Should only a single array, or layer of arrays, of intermediate reinforcing pins be present, the intermediate reinforcing pin array(s) overlap in the reinforcement direction with the arrays 6 of reinforcing pins extending from each of the opposed component surfaces. Should a plurality of layers of arrays of intermediate reinforcing elements be present through the thickness of the component, arrays of intermediate reinforcing pins may overlap each other in the reinforcing direction, maintaining a continuous presence of reinforcing elements throughout the thickness of the component between the opposed component surfaces.

It will be appreciated that the presence of intermediate arrays of reinforcing pins allows for the reinforcement of considerably thicker composite components. The maximum component thickness according to this embodiment may be calculated as:

$$t_{max} = n \cdot L_{max} - (n-1) \cdot o \cdot t_{ply}$$

Where n is the number of overlapping layers of reinforcing pins arrays, o is the number of plies in each overlap region and $t_{ply}$, $L_{max}$ and $t_{max}$ are as above. For example, in a component comprising a single layer of intermediate reinforcing arrays, n=3 and the maximum component thickness is $$t_{max} = 3 \cdot L_{max} - 2 \cdot o \cdot t_{ply}$$

An advantage of this embodiment is the ability to reinforce through the thickness of more complex shaped components. The introduction of intermediate block arrays facilitates the creation of more complex pinning combinations, allowing for through thickness reinforcement of a greater range of composite components. This also provides for increased freedom in the design process for composite components.

This embodiment may also be used to advantage when it is desired for example to use shorter pins, or other reinforcing elements. It is commonly found that longer reinforcing pins are more difficult to drive into the uncured composite material, and that shorter reinforcing pins thus provide better mechanical performance. By employing intermediate array(s) of reinforcing pins, a component of any given thickness may be reinforced through the complete component thickness using shorter reinforcing elements, facilitating insertion of these elements and allowing for improved mechanical performance.

Returning to the embodiment illustrated in FIGS. 3 and 4, and considering the plan projection of FIG. 4, it can be seen that the block arrays 6 of reinforcing pins are angled with respect to the primary x axis of the component 2. The long axis of the arrays 6, parallel to the long sides of length l, is angled at + or −45 degrees to the primary axis x, and hence also to the secondary axis y. In the illustrated embodiment, the arrays 6 are tessellated to form a herringbone pattern, as best seen in FIG. 4. However, other arrangements or tessellations may also be employed. Arrays 6 that are adjacent on their long sides l have been inserted from, and thus extend from opposed surfaces, ensuring an even distribution of pin arrays 6 in the upper and lower halves of the component 2. It will be understood that a similar arrangement may be employed including intermediate block arrays, ensuring even distribution of pin arrays throughout the component thickness. The angled orientation of the block arrays ensures that there is no straight line extending all the way through the pattern of reinforcement, there is no step change in the presence or absence of reinforcing elements along either the principle or secondary axes. This means that the component 2 does not experience a step change in structural properties along these axes, as would be caused by a sharp divide between regions provided with Z-direction reinforcement and regions without. The herringbone pattern provides for a "feathered" effect in which the transition between areas with and without Z-direction reinforcement is graduated.

It will be appreciated that the gradual transition afforded by the herringbone pattern of reinforcement block arrays is particularly suited to curved composite structures. Conventional pinning arrays are difficult to apply in such structures but the segmented arrays of the present invention lend themselves well to a curved structure.

It will also be appreciated that the angled arrays 6, whether or not tessellated in a herringbone pattern, may also be employed with all arrays 6 inserted from the same side, if the composite structure 2 is sufficiently thin to enable through thickness reinforcement to be achieved with a single pin length. The benefits afforded by the angled arrays are equally applicable to comparatively thin or thick composite structures.

The present invention thus provides a component and method of construction that allows the reinforcement of thick composite laminates through their full thickness, where it would otherwise not be possible to use Z-direction reinforcing elements due to the limitation of maximum element length. This is achieved by alternately inserting adjacent arrays of elements from opposing surfaces of the composite structure, such that these elements extend from alternate sides in the finished component, preferably ensuring there is an overlap of reinforcing elements at the mid region. Intermediate arrays positioned within the thickness of the component and overlapping the arrays inserted from each opposing surface may also be included. Additionally the arrays are oriented, for example at 45 degrees, to the principal axis or laminate 0° direction. The resulting pattern may resemble a herringbone pattern. This pattern feathers the transition from areas with no reinforcing elements to areas of reinforcing elements, thus avoiding a step change in properties in the laminate.

The present invention has been described with respect to a substantially uni directional, pre-preg composite laminate component. However, the present invention may also be applied to woven or other fabric pre-preg laminates, or other composite structures, to beneficial effect. The surface and intermediate reinforcement arrays, angled arrays and resulting herringbone or other pattern are not limited to pin reinforcement but may be used with tufting, stitching and 3D weaving. They may thus also be applied to dry preform, resin infusion type processes.

The present invention may be employed in conjunction with all fibre types including for example carbon, glass, aramids, polymer and natural and in combination with any resin type.

The invention claimed is:

1. A layered composite component for a gas turbine engine, comprising:
    a plurality of stacked layers defining a component thickness between opposed component surfaces; and
    block arrays of reinforcing elements extending from each of the opposed component surfaces, the reinforcing elements of each block extending only partially through the component thickness, wherein adjacent block arrays extend from opposing sides of the component surfaces, and the block arrays of reinforcing elements form a herringbone pattern.

2. A component as claimed in claim 1, wherein the block arrays of reinforcing elements extend perpendicular to the component surfaces.

3. A component as claimed in claim 1, wherein the block arrays of reinforcing elements comprise pins.

4. A component as claimed in claim 1, wherein block arrays of reinforcing elements extending from opposed component surfaces overlap in a reinforcement direction.

5. A component as claimed in claim 1, further comprising at least one intermediate reinforcing element extending through a region of the component thickness that is distant from each of the opposed component surfaces.

6. A component as claimed in claim 5, wherein block arrays of reinforcing elements from opposed component surfaces overlap with the at least one intermediate reinforcing element in a reinforcing direction.

7. A component as claimed in claim 5, wherein each stacked layer of the component comprises in-plane reinforcing fibres having a direction, and the block arrays of reinforcing elements extend such that an overlap region in the reinforcing direction of the reinforcing elements includes adjacent stacked layers having different reinforcing fibre directions.

8. A component as claimed in claim 7, wherein the overlap region of the block arrays of reinforcing elements is at least the thickness of six stacked layers.

9. A component as claimed in claim 1, wherein the stacked layers of the component comprise a primary in-plane axis, and the block arrays of reinforcing elements are angled in the plane of the layers with respect to the primary in-plane axis.

10. A layered composite component comprising:

a plurality of stacked layers defining a plane and having a primary in-plane axis; and a plurality of block arrays of reinforcing elements; wherein the block arrays of reinforcing elements extend into the component along a reinforcing direction that is angled with respect to the plane of the stacked layers, the block arrays of reinforcing elements are angled in the plane of the stacked layers with respect to the primary axis, and the block arrays of reinforcing elements are angled in the plane of the stacked layers to form a herringbone pattern.

11. A component as claimed in claim 10, wherein the plurality of block arrays of reinforcing elements extends along a reinforcing direction that is perpendicular to the plane of the stacked layers.

12. A component as claimed in claim 10, wherein the component comprises at least one curved surface.

* * * * *